United States Patent Office 3,435,711
Patented Apr. 1, 1969

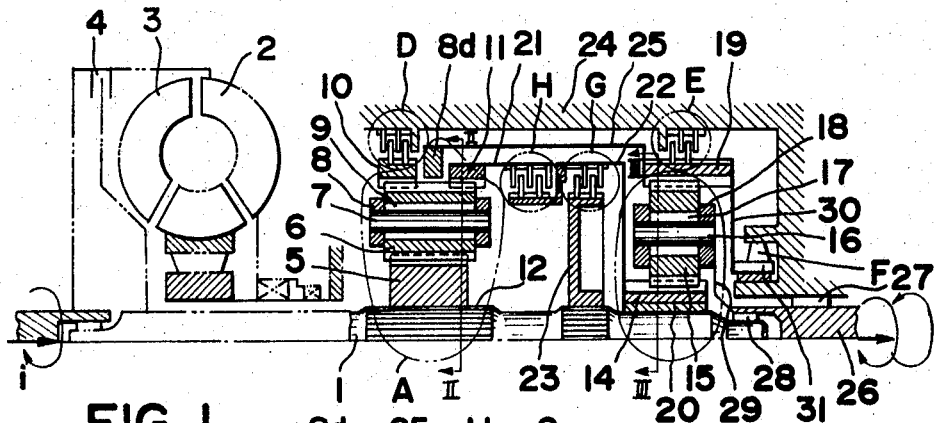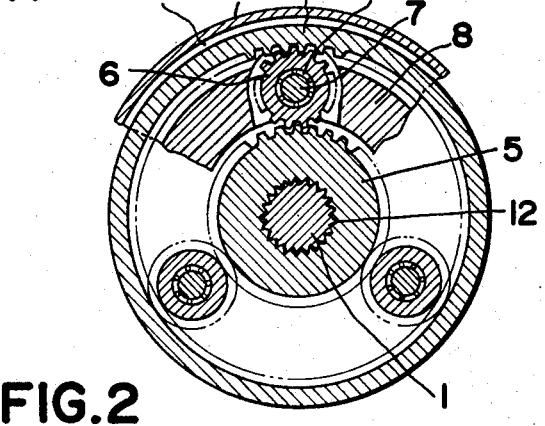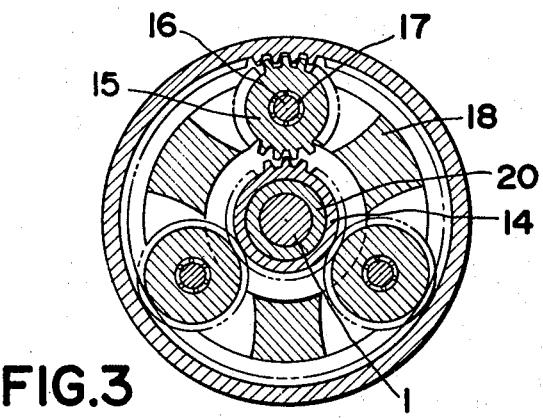

3,435,711
PLANETARY TRANSMISSION
Jun Kakei, Yokohama, Japan, assignor to Nissan Jidosha
Kabushiki Kaisha, Yokohama, Japan
Filed Dec. 4, 1967, Ser. No. 687,531
Claims priority, application Japan, Dec. 22, 1966,
41/83,547
Int. Cl. F16h 1/28
U.S. Cl. 74—765                                       3 Claims

ABSTRACT OF THE DISCLOSURE

A mechanical transmission which is suitable for vehicles such as trucks, having two compact planetary gear sets, two clutches and two brakes provides three forward and one reverse speed ranges. The transmission provides two front ring gears to the front planetary gear set, a front sun gear secured to the input shaft, a rear carrier secured to the output shaft, and a front carrier secured to a rear ring gear.

---

Figure 4:
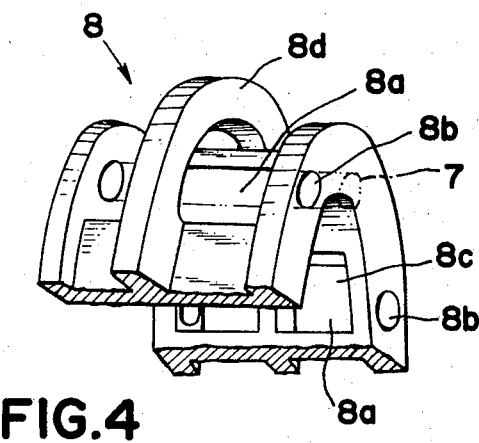

This invention relates to improvements in mechanical transmission of a power transmission system. More specifically, this invention relates to mechanical transmission having an input shaft which may be a turbine shaft of a hydraulic torque converter or a hydraulic coupling or simply a mechanical drive shaft, a pair of simple planetary gear sets disposed in line, two clutches being operable between specified rotating elements respectively, two brakes being operable between a specified rotating element and the casing respectively, and means securing specified rotational elements. The present invention provides a mechanical transmission having three forward and one reverse speeds to the output shaft by suitably operating said clutches and brakes and being particularly suitable to power train of automatic or semi-automatic transmission for heavy vehicles such as trucks or like that providing wide reduction range.

The terms clutch and brake are elements adapted to provide clamping force to the corresponding frictional surfaces by means of hydraulic, pneumatic or other power source so as to prohibit relative movement of corresponding parts. Thus, in the specification and claims, "friction element" includes clutch and brake, "clutch" means connecting or separating means between rotatable parts, "brake" means securing or releasing means between stational casing part and rotatable part.

One form of transmission heretofore proposed for such heavy vehicles having three forward and one reverse speeds and providing sufficient wide reduction range is well known. The transmission comprises three simple planetary gear sets disposed axially on the input or the output shaft, a clutch between rotatable elements and three brakes between the casing and the rotatable elements respectively. However, the transmission must provide three planetary gear sets.

Another known planetary transmission comprises two planetary gear sets and provides three forward and one reverse speeds to the output shaft. The transmission is suitable for light weight to power ratio vehicles, but cannot be adapted to heavy vehicles such as trucks because of inherent narrow reduction range.

Accordingly, the primary object of the present invention is to provide a mechanical transmission having wide reduction range and providing only two planetary gear sets, without increasing friction elements, such as clutches or brakes.

Another object of the present invention is to provide a mechanical transmission having no element which will rotate faster than the input shaft through all selected speeds.

A further object of the invention is to provide a simple and compact mechanical transmission of greater power capacity with light weight and long life.

These and other objects, features and advantages of the present invention and the manner in which the invention is carried into practice are made apparent in the following detailed description of one preferred embodiment, by way of example, wherein reference is made to the accompanying drawings, in which:

FIG. 1 shows schematically an axial sectional view of upper half of the mechanical transmission according to the invention, FIG. 2 shows a sectional view along line II—II of FIG. 1, FIG. 3 shows a sectional view along line III—III of FIG. 1, and FIG. 4 shows a partially broken perspective view of the front carrier shown in FIG. 1, In the drawings, FIG. 1 through FIG. 4 shows one embodiment of the mechanical transmission according to the present invention, and same reference numerals are used to represent similar parts. Referring to the drawings, especially to FIG. 1, 1 designates an input shaft of the mechanical transmission, and the leftside phantom portions designated by chain line show a conventional power input path. As shown a power source such as prime mover may transmit power as indicated by arrow i, to a pump 2 of a torque converter and as the torque converter is filled with fluid, the power is transmitted to a turbine 3 which is secured to the input shaft 1. Alternately, the power can be transmitted to the input shaft 1 directly, as by engaging a clutch 4.

The mechanical transmission according to the invention provides a front planetary gear set A comprising a front sun gear 5, front planet gears 6 meshing to the sun gear 5, front planet gear shaft 7 carrying the planet gears 6, a front planetary carrier 8 supporting the shaft 7, front planet gear bearings 9 inserting between the shafts 7 and the gears 6, and two ring gears 10 and 11 meshing with the planet gears 6. The front sun gear 5 is integral or secured to the input shaft 1 through such as splines 12 as shown. The front planet gear shafts 7 are secured to the front carrier 8, thus the assembled element is mentioned as a "front carrier assembly" in the specification.

As to the two ring gears 10 and 11, the leftside ring gear is mentioned as an "intermediate ring gear" 10, and the rightside gear is mentioned as a "reverse ring gear" 11; both rings gears 10 and 11 provide same number of teeth. One embodiment of the front planetary gear set A having three planet gears 6 is shown in FIG. 2 as a transverse sectional view. The front planetary carrier 8 is shown in FIG. 4 as a perspective view. As shown in FIG. 4 curved spaces 8a accommodate front planet gears 6 respectively, cylindrical inside openings 8b carry front planet gear shaft 7 as shown in phantom line respectively, and an axial cylindrical opening 8c accommodates the front sun gear 5. At the central outward portion of the carrier 8, a flange 8d is secured or integral to the carrier, bridging the planet gears 6 as shown and separates two ring gears 10 and 11 as shown in FIG. 1.

The other simple planetary gear set is mentioned as a "rear planetary gear set B," comprising a sun gear 14, rear planet gears 15 meshing with the sun gear 14, rear planet gear shafts 16 supporting the rear planet gears 15 respectively, rear planet gear bearings 17 carrying the rear planet gears 15 respectively, a rear planetary carrier 18 supporting the both ends of the rear planet gear shafts 16, and a ring gear 19 meshing with the rear planet gears 15. The rear sun gear 14 is rotatably supported by the input shaft 1 through suitable means such as a bushing 20.

The rear planet gear shafts 16 are secured to the rear planetary carrier, and the assembled element is mentioned as a "rear carrier assembly." One embodiment of the rear planetary gear set B is shown in FIG. 3.

Clutches engaging or disengaging specified rotatable elements, brakes engaging or disengaging between the casing and rotatable element, and means connecting between specified elements will now be explained. A reverse-high clutch H is operable between a clutch drum 21 connected to the reverse ring gear 11 and a clutch drum 22 connected to the rear sun gear 14, and a forward clutch G is operable between a flange 23 secured to the input shaft 1 and the clutch drum 22 connected to the rear sun gear 14. An intermediate brake D is operable between the intermediate ring gear 10 and the casing 24, and a low-reverse brake E is operable between the rear ring gear 19 and the casing 24. The brakes and clutches are shown as having multiple plates which are so-called clutch form, but the other suitable brakes or clutches, such as band brake, cone brake, or electro-magnetic clamping means can be utilized as desired.

The rear ring gear 19 is connected to the flange 8d of the front carrier 8 by a connecting drum 25. An output shaft 26 supported by the casing 24 through suitable bearing means 27 which in turn supports the input shaft 1 through suitable bearing 28 and is connected to the rear carrier assembly through a flange means 29.

Further, the shown embodiment provides a one-way brake F between the casing 24 and the rear ring gear 19. That is, a flange 30 connected to the rear ring gear 21 is secured to an inner ring 31 of the one-way brake F and an outer ring of the brake F is secured to the casing 24. The one-way brake F permits rotation of the rear ring gear 21 to the direction of the rotation of the input shaft 1 and prevents reverse rotation of the ring gear 19. As will be explained in more detail, the one-way brake F is not essential to the mechanical transmission according to the invention and can be omitted as desired.

The mechanical transmission according to the invention, assembled as described, transmits the input power transmitted to the input shaft 1 directly or through a suitable means such as the torque converter to the output shaft 26 at a selected rotational speed determined by engagement of essentially two friction elements which are operated automatically or manually by suitable means such as hydraulic control system not shown.

The function of the mechanical transmission according to the invention is shown in Table 1. There is shown five speed ranges, neutral, low range, intermediate range, high range and reverse range, which are attainable by the shown transmission, and also shown how the clutches and the brakes and the one-way brake is engaged by each speed range, and the reduction ratio relative to the gear ratios of the planetary gear sets.

TABLE 1

| Speed ranges | Fric. elements | | | | | Reduction ratio |
| --- | --- | --- | --- | --- | --- | --- |
| | Clutches | | Brakes | | One-way brake | |
| | G | H | D | E | F | |
| Reverse | − | o | − | o | − | $-l_1(1+l_2)$ |
| Neutral | − | − | − | − | − | |
| Forward: | | | | | | |
| Low | o | − | − | o | o | $1+l_2$ |
| Int | o | − | o | − | − | $1+\dfrac{l_1 l_2}{1+l_1+l_2}$ |
| High | o | o | − | − | − | 1 |

In Table 1:

"o" shows engagement of corresponding clutch or brake, or engagement of the one-way brake F preventing reverse movement of the rear ring gear 19;

"−" shows disengagement of corresponding clutch or brake permitting relative movement;

The reduction ratio shows rotational speed of the input shaft 1 by rotational speed of the output shaft 26;

$l_1$ shows gear ratio of the front planetary gear set A, that is ratio of numbers of gear teeth between the intermediate or reverse ring gear 10 or 11 and the front sun gear 5; and $l_2$ shows gear ratio of the rear planetary gear set B, that is ratio of numbers of gear teeth between the rear ring gear 19 and the rear sun gear 14.

Each range listed in the Table 1 will be explained in more detail.

Neutral: All the clutches and brakes are disengaged. The front sun gear 5 of the front planetary gear set A is rotated integral to the input shaft 1. However, the rear planetary gear set B will not rotate, because of the free rotation of the intermediate ring gear 10 and the reverse ring gear 11. In practice, clutches and brakes include small amount of hydraulic friction so that slow rotation is seen to the rear sun gear 14 and the rear ring gear 19 of the rear planetary gear set B; however, such rotation has no practical effect to the stationary rear carrier assembly and the output shaft 26 which is integral thereof.

Low range: The clutch G and the brake E are engaged. As the input shaft 1 drives the output shaft 26 at the low range, the one-way brake F prevents reverse movement of the rear ring gear 19 thus assists the brake E. However, as the output shaft 26 drives input shaft 1, such as so-called engine brake operation of the vehicle, the one-way brake F serves nothing to the low range transmission. The low range is attained by disengagement of the brake E, by virtue of the one-way brake F transmitting the reaction torque of the rear ring gear 19 to the casing 24, but in this case, the above mentioned engine brake effect cannot be attained.

As the brake E is engaged, the front carrier 8 and the rear ring gear 19 are prevented from rotation. As the clutch G is engaged, the front sun gear 5 and the rear sun gear 14 rotate with the input shaft 1. As the intermediate ring gear 10 and the reverse ring gear 11 rotate freely, the front planetary gear set A serves nothing to the power transmission. In the rear planetary gear set B, the rotational moment from the input shaft 1, through the integrally engaged clutch G and the rear sun gear 14, is transmitted through the rear carrier assembly 16 and 18 to the output shaft 26 by the gear reduction ratio of $(1+l_2)$.

Intermediate range: The clutch G and the brake D are engaged. As the clutch G is engaged, the input shaft 1, the front sun gear 5 and the rear sun gear 14 rotate integrally. As the brake D is engaged, the intermediate ring gear 10 is stationary. Thus the rotational speed of the front sun gear 5 is transmitted to the front planetary carrier 7 and 8 at the rotational speed of $1/(l_1+1)$, and also to the integrally secured connecting drum 25 and the rear ring gear 19: as the ring gear 19 rotates to the direction of the input shaft 1, the one-way brake F serves nothing to the rotation. As the rear sun gear 14 rotates integrally with the input shaft 1, the rotational speed of the rear carrier assembly 16 and 18 and the output shaft 26 is $$\frac{1+l_1+l_2}{(1+l_1)(1+l_2)}$$

to the input shaft, so that the reduction ratio is $$1+[l_1 l_2/(1+l_1+l_2)]$$

As mentioned above, the low range is attained by engaging the clutch G and the brake E. However, by disengaging the brake E, the one-way brake F is effective to prevent the reverse rotation of the rear ring gear 19 so that the low range is also attained. As the upshifting from low range to intermediate range, clutch G is also engaged and disengagement of the brake E and engagement of the brake D is necessary. To provide suitable engage and disengage timing between the brakes D and E it is preferable to disengage the brake E earlier and let the one-way brake F to sustain the reaction torque before applying the brake D.

High range: Clutches G and H are engaged and the brakes D and E are disengaged. The front sun gear 5, the reverse ring gear 11, and the rear sun gear 14 rotate integral to the input shaft 1 through the clutch drum 21 and 22. As the front carrier assembly 7 and 8 rotate integral to the input shaft 1 at the front planetary gear set A, the connecting drum 25 and the rear ring gear 19 also rotate with the input shaft 1. As the rear ring gear 19 and the rear sun gear 14 rotate integral to the input shaft 1, as the rear planetary gear set B the rear carrier assembly 16 and 18 and the output shaft 26 rotate integral to the input shaft 1, so that the reduction ratio is 1.

Reverse range: The clutch H and the brake E are engaged. The reverse ring gear 11 and the rear sun gear 14 are secured each other and the rear ring gear 19 is secured to the casing 24. As the rear ring gear 19 is prevented from forward rotation thereof, the one-way brake F is ineffective to the reverse range. As the front carrier assembly 7 and 8 is secured to the casing 24 by the brake E, at the front planetary gear set A the rotation of the input shaft 1 and the front sun gear 5 is transmitted to the reverse ring gear 11 by the stationary front planetary carrier 8 to effect the rotation of $-1/l_1$, i.e., to the reverse direction, of the ring gear 11. The reduced and reversed rotation is transmitted to the rear sun gear 14 through the clutch drum 21, the clutch H and the clutch drum 22. At the rear planetary gear set B, as the rear ring gear 19 is stationary, the rotation of the rear sun gear 14 is transmitted to the rear carrier assembly 18 and 16 and the output shaft 26 and the rotational speed is reduced further $1/(1+l_2)$ times, so that the overall reduction ratio is $-l_1(1+l_2)$.

The reduction ratios shown in Table 1 provide relatively larger values which are suitable to vehicles such as truck or like that having relatively large weight to power ratio. As a practical example, $l_1 \simeq 1.8$ and $l_2 \simeq 2.8$, the reduction ratios of the transmission are as follows:

Forward low range≃3.8
Forward intermediate range≃1.9
Reverse range≃—6.8

It will be appreciated from the foregoing detailed description, the mechanical transmission according to the invention comprises minimum number of components, i.e. two simple planetary gear sets, two clutches and two brakes, and provides three forward and one reverse range transmission having relatively large reduction ratios. Consequently the mechanical transmission can be manufactured as a lightweight, compact and economical unit. Also, applied loads to each gears are limited to minimum as no torque circulation is occurred at any ranges of low, intermediate and reversing drive, so that the gears can be made smaller. Further, no component rotates faster than the input shaft and only a few components rotate at neutral range, so that power loss and frictional wear are relatively small value and idling operation of the engine is easily performed.

What I claim is:

1. A mechanical transmission comprising in combination;

an input and an output shaft and a casing;

a front planetary gear set providing a front sun gear, at least one front planet gear meshing with the front sun gear, a front carrier assembly which is integral with a shaft supporting the planet gear, and a first and a second front ring gear each meshing with said front planet gear respectively;

a rear planetary gear set providing a rear sun gear, at least one rear planet gear meshing with the rear sun gear, a rear carrier assembly which is integral with a shaft supporting the planet gears and a rear ring gear meshing with the planet gears;

said front sun gear being secured to said input shaft, said front carrier assembly being secured to said rear ring gear and said rear carrier assembly being secured to said output shaft; and a friction element being inserted between said second front ring gear and said rear sun gear, a friction element being inserted between said input shaft and said rear sun gear, a friction element being inserted between said first ring gear and said casing, and a friction element being inserted between said rear ring gear and said casing.

2. A mechanical transmission claimed in claim 1, wherein a flange means extending between said first and second front ring gears and being secured to said front carrier assembly is connected to said rear ring gear.

3. A mechanical transmission claimed in claim 1, further provides a one-way friction element means connecting between said rear ring gear and the casing to prevent reverse rotation of the rear ring gear relative to the input shaft.

References Cited

UNITED STATES PATENTS

| | | | |
|---|---|---|---|
| 2,552,000 | 5/1951 | Du Bois | 74—764 |
| 2,851,906 | 9/1958 | De Lorean | 74—765 X |
| 2,956,448 | 10/1960 | Edsall | 74—765 X |

DONLEY J. STOCKING, *Primary Examiner.*

T. C. PERRY, *Assistant Examiner.*